United States Patent
Liang et al.

(10) Patent No.: US 7,565,009 B2
(45) Date of Patent: Jul. 21, 2009

(54) SYSTEM AND METHOD FOR DYNAMIC FAST TOBOGGANING

(75) Inventors: Jianming Liang, Paoli, PA (US); Luca Bogoni, Philadelphia, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 779 days.

(21) Appl. No.: 11/145,887

(22) Filed: Jun. 6, 2005

(65) Prior Publication Data

US 2005/0271278 A1 Dec. 8, 2005

Related U.S. Application Data

(60) Provisional application No. 60/577,527, filed on Jun. 7, 2004.

(51) Int. Cl.
 *G06K 9/34* (2006.01)
(52) U.S. Cl. .......................... 382/173; 382/164; 382/180
(58) Field of Classification Search ................. 382/164, 382/173, 180; 358/538
See application file for complete search history.

(56) References Cited

U.S. PATENT DOCUMENTS 6,532,302 B2* 3/2003 Krtolica ...................... 382/173
2003/0223627 A1* 12/2003 Yoshida et al. .............. 382/128

OTHER PUBLICATIONS

Mortensen et al. ("Toboggan-based intelligent scissors with a four-parameter edge model," IEEE Conference on Computer Vision and Pattern recognition, vol. 2, Jun. 23-25, 1999, pp. 452-4580).*
Zhu et al. ("Medical image segmentation using level set and watershed transform," SPIE vol. 4958 (2003), pp. 294-302).*
Yao et al. ("Fast image segmentation by sliding in the derivative terrain," SPIE vol. 1607 (1991), pp. 369-379).*
Fairfield ("Tobbogan contrast enhancement for contrast segmentation," 10th ICPR, Jun. 16-21, 1990, pp. 712-716).*
Barrett W. A. et al., "Intelligent Segmentation Tools", *Biomedical Imaging 2002, Proceedings. 2002 IEEE International Symposium*, Jul. 7, 2002, pp. 217-220.
Mortensen E. N. et al., "Interactive Segmentation with Intelligent Scissors", *CVGIP Graphical Models and Image Processing*, Academic Press, vol. 60, No. 5, Sep. 1998, pp. 1077-3169.
J.B.T.M. Roerdink et al., "The Watershed Transform: Definitions, Algorithms and Parallelization Strategies", *Fundamenta Informaticae*, vol. 41, 2001, pp. 187-228.
International Search Report including Notification of Transmittal of the International Search Report, International Search Report, and Written Opinion of the International Searching Authority.

* cited by examiner

*Primary Examiner*—Yubin Hung

(57) ABSTRACT

A method of identifying an object in a digital image includes finding a point in a digital image that is a concentration location, initializing a cluster with said concentration location, adding the neighboring points of the concentration location to a list, selecting a neighbor point with an extremal potential value from said list, determining a slide direction of all neighbors of said selected point and identifying those neighbors that slide to the selected point, adding those neighbor points not already in the list to the list, adding the selected point to the cluster, and repeating the steps of selecting a neighbor point with an extremal potential value, determining a slide direction, adding points to the list, and adding the selected point to the cluster, until the list is empty.

7 Claims, 5 Drawing Sheets

| 538 | 518 | 516 | 524 | 534 | 520 | 506 | 526 | 534 |
|-----|-----|-----|-----|-----|-----|-----|-----|-----|
| 509 | 525 | 336 | 311 | 321 | 328 | 328 | 533 | 523 |
| 524 | 332 | 302 | 308 | 308 | 317 | 315 | 326 | 515 |
| 519 | 337 | 314 | 301 | 327 | 312 | 334 | 314 | 528 |
| 536 | 330 | 333 | 330 | 534 | 308 | 334 | 312 | 522 |
| 530 | 307 | 300 | 518 | 501 | 508 | 324 | 314 | 518 |
| 518 | 316 | 306 | 537 | 527 | 527 | 320 | 321 | 528 |
| 501 | 337 | 508 | 519 | 515 | 512 | 536 | 329 | 525 |
| 533 | 537 | 508 | 517 | 533 | 522 | 533 | 512 | 532 |

FIG. 1

SYSTEM AND METHOD FOR DYNAMIC FAST TOBOGGANING

CROSS REFERENCE TO RELATED UNITED STATES APPLICATIONS

This application claims priority from "Dynamic Fast Toboggan", U.S. Provisional Application No. 60/577,527 of Liang, et al., filed Jun. 7, 2004, the contents of which are incorporated herein by reference.

TECHNICAL FIELD

This invention is directed to toboggan-based object segmentation in digital medical images.

DISCUSSION OF THE RELATED ART

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

The process of classifying, identifying, and characterizing image structures is known as segmentation. Once anatomical regions and structures are identified by analyzing pixels and/or voxels, subsequent processing and analysis exploiting regional characteristics and features can be applied to relevant areas, thus improving both accuracy and efficiency of the imaging system. One method for characterizing shapes and segmenting objects is based on tobogganing. Tobogganing is a non-iterative, single-parameter, linear execution time over-segmentation method. It is non-iterative in that it processes each image pixel/voxel only once, thus accounting for the linear execution time. The sole input is an image's 'discontinuity' or 'local contrast' measure, which is used to determine a slide direction at each pixel. One implementation of tobogganing uses a toboggan potential for determining a slide direction at each pixel/voxel. The toboggan potential is computed from the original image, in 2D, 3D or higher dimensions, and the specific potential depends on the application and the objects to be segmented. One simple, exemplary technique for defining a toboggan potential would be as the intensity difference between a given pixel and its nearest neighbors. Each pixel is then 'slid' in a direction determined by a maximum (or minimum) potential. All pixels/voxels that slide to the same location are grouped together, thus partitioning the image volume into a collection of voxel clusters. Tobogganing can be applied to many different anatomical structures and different types of data sets, e.g. CT, MR, PET etc., on which a toboggan type potential can be computed.

SUMMARY OF THE INVENTION

Exemplary embodiments of the invention as described herein generally include methods and systems for a toboggan-based shape characterization and object segmentation that includes computing a toboggan potential, tobogganing, extracting object of interest and computing shape feature parameters. In the approaches herein described, a pixel or voxel slides only when necessary, and the toboggan potential is computed only when needed in the toboggan process. Toboggan processes according to embodiments of the invention are accelerated as compared to current toboggan processes due to a more efficient computation and the selection of the locus in which the computation is performed.

According to an aspect of the invention, there is provided a method for identifying an object in an image, including providing a digitized image comprising a plurality of intensities corresponding to a domain of points in a N-dimensional space, finding a point in the image that is a concentration location, expanding from said concentration point by including neighboring points of said concentration point based on a toboggan potential of each neighboring point to form a cluster of points, and obtaining an object from said cluster.

According to a further aspect of the invention, expanding from said concentration point further comprises marking said concentration location with a unique label, marking the neighboring points of the concentration location with said unique label, selecting a marked point with an extremal toboggan potential value, identifying those neighbors of said selected point that slide to the selected point, marking those neighbors that slide to the selected point that are unmarked with the selected point's label, and adding the selected point to said cluster of points.

According to a further aspect of the invention, selecting a point with an extremal toboggan potential value comprises computing a toboggan potential for each said marked point.

According to a further aspect of the invention, identifying those neighbors that slide to the selected point comprises determining a slide direction for all neighbors of said selected point.

According to a further aspect of the invention, the steps of selecting a point with an extremal potential value, identifying neighbors, marking neighbors, and adding the selected point to the cluster are repeated until there are no more marked points.

According to a further aspect of the invention, the extremal potential is a minimum potential.

According to a further aspect of the invention, the extremal potential is a maximum potential.

According to a further aspect of the invention, finding a point in the image that is a concentration location further comprises, selecting a point in the image, finding a neighboring point with an extremal potential with respect to the selected point, sliding to said neighboring point, and repeating the steps of finding a neighboring point with an extremal potential and sliding to said neighboring point until a point is reached that cannot slide to a neighbor point.

According to a further aspect of the invention, finding a neighboring point with an extremal potential comprises determining the potential of each neighbor of the selected point.

According to a further aspect of the invention, the extremal potential is a minimum potential.

According to a further aspect of the invention, the extremal potential is a maximum potential.

According to another aspect of the invention, there is provided a program storage device readable by a computer, tangibly embodying a program of instructions executable by the computer to perform the method steps for identifying an object in a digital image.

BRIEF DESCRIPTION OF THE DRAWINGS

FIG. 1 depicts a 2D artificial image created to resemble a colon cross section, according to an embodiment of the invention.

DETAILED DESCRIPTION OF THE PREFERRED EMBODIMENTS

Exemplary embodiments of the invention as described herein generally include systems and methods for performing a toboggan-based object segmentation using a distance transform to find and characterize shapes in digital medical images. Although an exemplary embodiment of this invention is discussed in the context of segmenting and characterizing the colon and in particular colon polyps, it is to be understood that the toboggan-based object segmentation methods presented herein have application to 3D CT images, and to images from different modalities of any dimensions on which a gradient field can be computed and toboggan can be performed. For simplicity of discussion, the embodiments presented herein are presented in terms of a 2D artificial-image. It is to be understood that this 2D artificial-image is exemplary and non-limiting, and that the methods herein disclosed are applicable to segmenting and identifying objects in digital images of arbitrary. In particular, although reference is made to pixels, it is to be understood that in the context of a 3D or higher dimensional images, the term 'pixel' can be replaced by the term 'voxel'.

In tobogganing, each pixel in an object of interest slides to a neighbor with a minimal potential or climbs to a neighbor with a maximal potential. This process of sliding/climbing is referred to a tobogganing. The tobogganing terminates at a pixel that is either a local minimum or a local maximum. This terminating pixel is referred to as a concentration location. All the pixels that slide/climb together form a toboggan-cluster.

Figure 2:
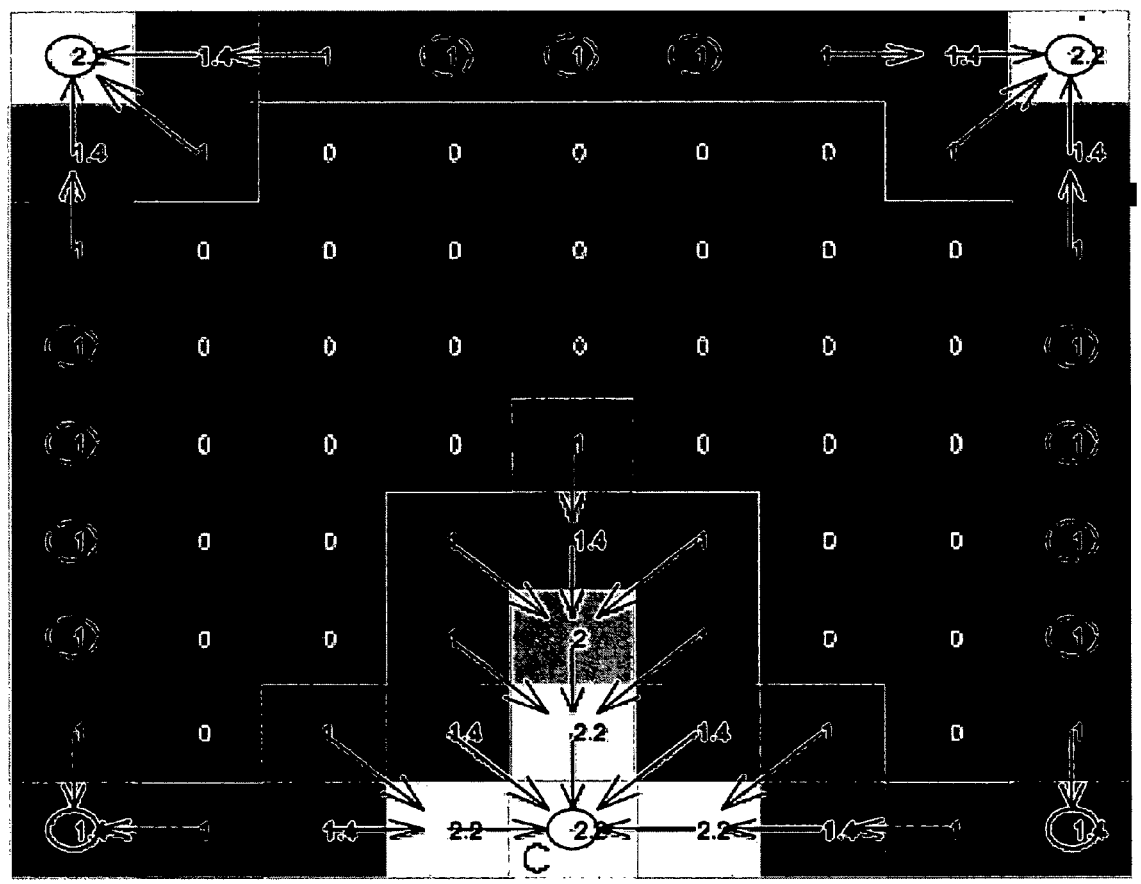
FIG. 2 depicts a distance map computed from FIG. 1, and how pixels in the object of interest were slid to their respective concentration points, according to an embodiment of the invention.

Tobogganing relies on a computed potential to determine the sliding direction at each location (voxel or pixel). There are many options in selecting toboggan potential. One exemplary, non-limiting potential can be obtained from a distance map resulting from the computation of a distance transform, disclosed in the inventor's co-pending application, "System and Method for Toboggan-based Object Segmentation using Distance Transform", U.S. patent application Ser. No. 11/145,888, filed concurrently herewith. In order to determine a distance map, an intensity threshold is determined for the pixels in an image, where points with an intensity above a pre-determined intensity threshold form the object of interest, while those whose intensity is below the threshold value form a reference object. For example, FIG. 1 presents a 2D artificial-image created to resemble colon cross-section, with the object of interest being a polyp, defined by tissue values greater than 500 in this example, surrounded by the reference object, the lumen, defined in this example by tissue values below 500. A distance map can be computed for each pixel in the object of interest, where the distance map is defined as the distance from the pixel to a pixel in the reference object. FIG. 2 depicts the distance map computed from FIG. 1, and how pixels in the object of interest were slid to their respective concentration points. Pixels represented by non-zero values form the object of interest, while pixels represented by zeros form the reference object. The pixel values are the distance transform potential values for each pixel. The sliding direction of the pixels in the object of interest are indicated by the arrows in the figure. The concentration locations are circled. In this example, 16 toboggan clusters were formed, of which 11 are single-pixel clusters. No tobogganing is perform d on pixels with zero potential.

However, the computational efficiency and resource usage can be improved upon by performing the toboggan computation only on those pixels of interest, and by computing the toboggan potential only as portion of an expansion from the concentration location, an acceleration referred to herein as fast tobogganing. Therefore, a dynamic toboggan potential is introduced that only computes the potential for a specified location. In the example presented above, the potential is the distance transform. For a given pixel, fast tobogganing forms a toboggan cluster that contains the given pixel without scanning the whole image. For example, if the concentration location in the image is the given pixel, then the desired toboggan cluster is that which contains the concentration location, depicted as being circled in FIG. 3. The cluster can be found sliding outward for the concentration location. Thus, one first searches for a concentration point and then expands a cluster from it, rather than tobogganing every point to a concentration location and then selecting the cluster that contains a given location.

Figure 4:
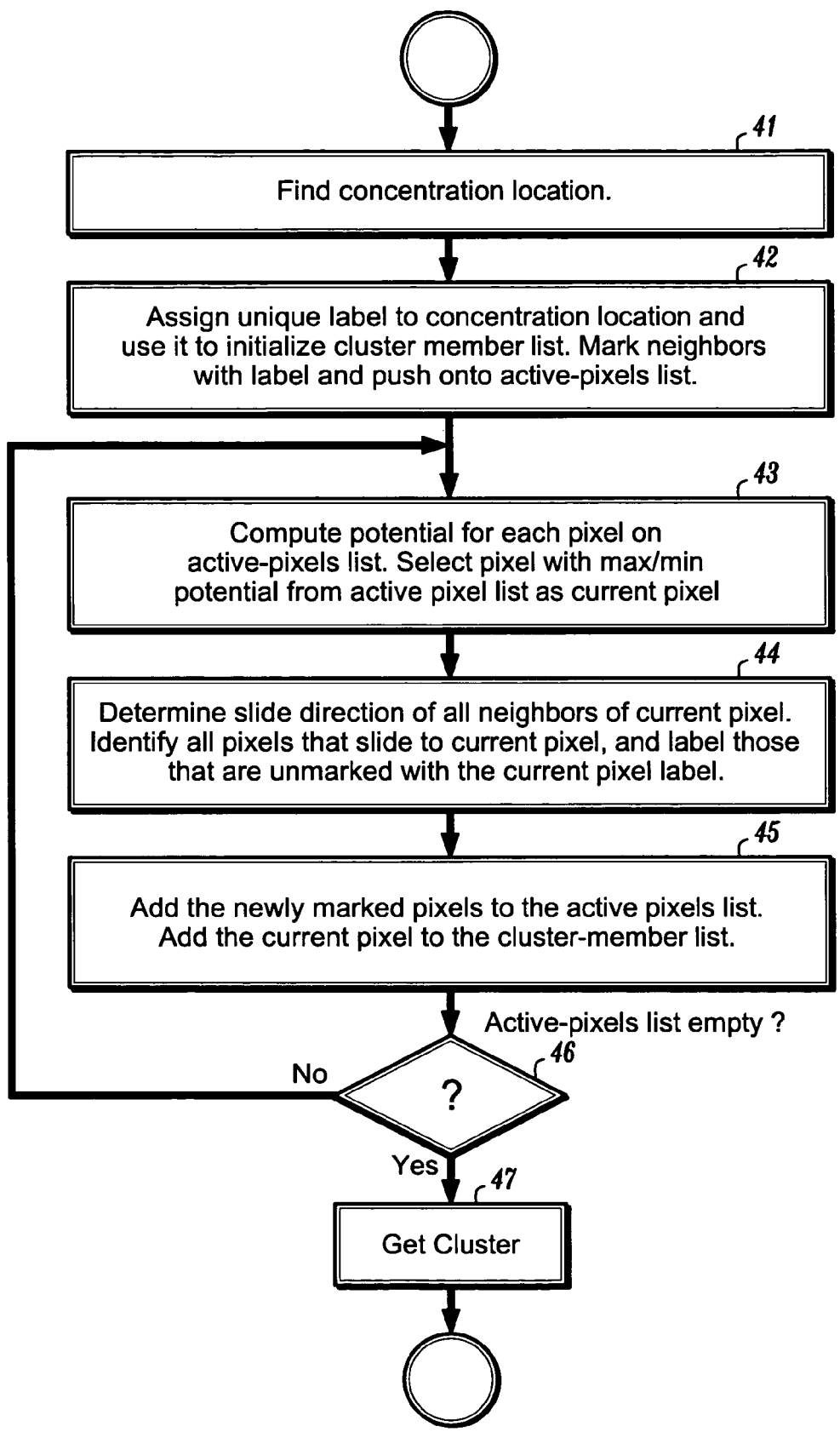
FIG. 4 depicts a flow chart of a dynamic fast toboggan method, according to an embodiment of the invention.

FIG. 4 depicts a flow chart of a dynamic fast tobogganing method according to an embodiment of the invention. At step 41, the toboggan concentration location is found. A selected location, either provided by a user or automatically generated, is regarded as a current voxel and is slid/climbed to a neighbor with an extremal potential. The extrema can be either a maximum or a minimum, depending upon the application. The process is repeated, with each neighbor so reached being regarded as the current voxel and being slid/climbed it until a concentration location, i.e. a voxel that cannot slide/climb to any of its neighbors, is reached. In the example depicted in FIG. 2, the center point, whose distance map value is 1.0, climbs to neighboring pixels with a maximum potential. These pixels have potential values of, successively, 1.4, 2.0, 2.2, and finally 2.8, which is a circled concentration location, labeled 'C'. Note that the concentration location is a local maximum: there are no pixels surrounding the concentration point with a potential greater that that of the concentration location. If the starting pixel is already a concentration point, it cannot slide, and then the processing can proceed to the next step.

The example depicted in FIG. 2 showed a pixel sliding to a neighbor with a maximum potential. Alternatively, an application could require that a pixel slide to a neighbor with a minimum potential. In this case, the concentration location would be a pixel with a local minimum potential, and no neighbor would have a potential less than that of the concentration location.

The next step is to expand from the concentration location to form a toboggan cluster. This could be done in a number of ways. According to the exemplary embodiments of the invention presented herein, the expansion can utilize two data structures. One is a cluster-member list, which can include all the pixels assigned to the cluster. The other data structure is an active-pixels list, which includes all the neighbors of those pixels in the cluster-member list. The active-pixel list can be implemented in any manner that permits a quick search, such as a priority queue or an open list, so that a pixel with a maximal/minimal potential can be found quickly for inclusion.

The expansion process can be described as a base and an iterative step. In a base step of the expansion, step 42, the concentration location is taken as the current expanded voxel, and is assigned a unique toboggan label. The cluster-member list is initialized with the concentration location. Its neighbors are marked and pushed onto the active pixels list. Marking the neighbors helps to ensure the uniqueness of a voxel in the active-pixels list.

The next steps are the series of repeated steps. First, at step 43, the toboggan potential is computed for each added neighbor in the active-pixels list. From the active-pixels list, a voxel with the minimal/maximal potential with respect to the current expanded voxel is selected and popped from the active-pixels list. This popped voxel becomes the current expanded voxel. At step 44, the sliding directions of the current expanded voxel are determined and those neighboring voxels to which it slides are identified and, if unmarked, are labeled with the label of the current expanded voxel. At step 45, the previously unmarked neighbors are added to the active-pixels list, and the current expanded voxel is added to the appropriate cluster-member list as determined by its concentration location label. If, at step 46, the active-pixels list is not empty, the previous steps 43, 44, 45 are repeated for each voxel in the active-pixels list with a extremal potential with respect to the current expanded voxel. Upon finishing, the cluster-member list includes 47 all pixels in the cluster. The sliding direction for each pixel in the cluster-member list can also be recorded during the tobogganing process.

Figure 3:
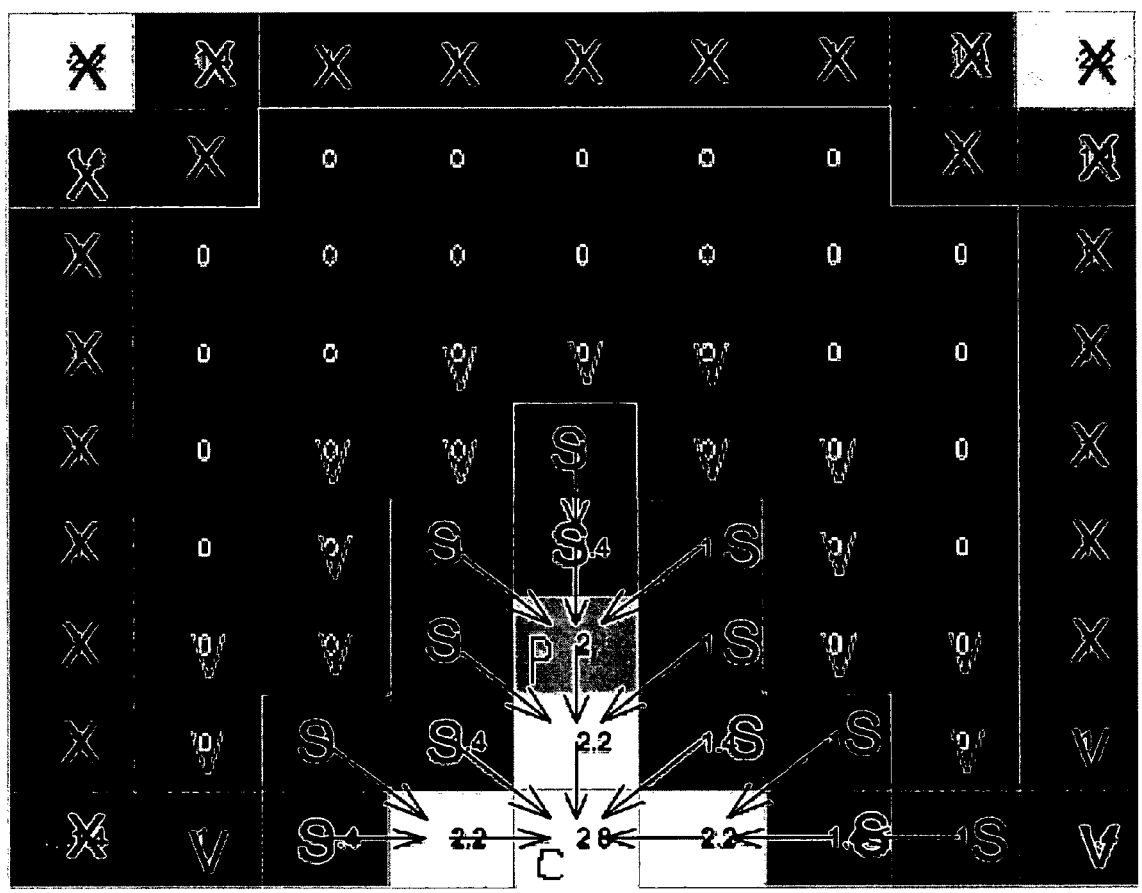
FIG. 3 depicts a cluster determined by dynamic fast tobogganing, according to an embodiment of the invention.

In a fast dynamic tobogganing according to an embodiment of the invention, only a small number of pixels, i.e. the pixels in the toboggan cluster containing the click point and those pixels on the boundary of the toboggan cluster, are involved. FIG. 3 depicts a cluster determined by dynamic fast tobogganing. The cluster being formed is centered on the lower edge of the image, its concentration location 'C' being at the center of the lower edge with potential 2.8. Note the arrows indicating how pixels in the cluster slide to the concentration location. In the example depicted in FIG. 3, pixels in the cluster concentrated around pixel 'C' are visited, since they are included in the toboggan cluster containing the click point 'P'. Therefore, one needs only to compute the potential for those pixels. The pixels marked with an 'S' are surface pixels which border pixels in the reference region (those with potential 0.0). In addition to the cluster member pixels, those pixels marked with 'V' participate in the dynamic fast tobogganing process. Those pixels marked with 'X' do not participate in the determination of this cluster.

A dynamic fast tobogganing according to an embodiment of the invention computes the potential of a pixel only when the pixel is pushed to the active-pixels list. No distance is computed for any of those pixels marked with an 'X' in FIG. 3, as those pixels are never pushed onto an active-pixels list for the concentration point 'C'. There is no limitation on the toboggan potentials useful with a dynamic fast toboggan process according to an embodiment of the invention. For example, a potential can be globally defined, by convolving the selected region of interest with a normalized gradient field centered at a current expanded voxel. Alternatively, a distance potential for a voxel can be defined locally by, for example, determining a distance from the voxel to a nearest voxel in a reference region. The dynamic distance transform, disclosed in the inventors' copending application "System and Method for Toboggan-based Object Segmentation using Distance Transform", is useful for this purpose, as only when a pixel is pushed onto the active-pixels list is its distance computed.

Simulations performed on a 43-cubed sub-volume, based on a specified location, indicate that a dynamic fast toboggan method according to an embodiment of the invention can be as much as ten times faster than previous toboggan methods.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
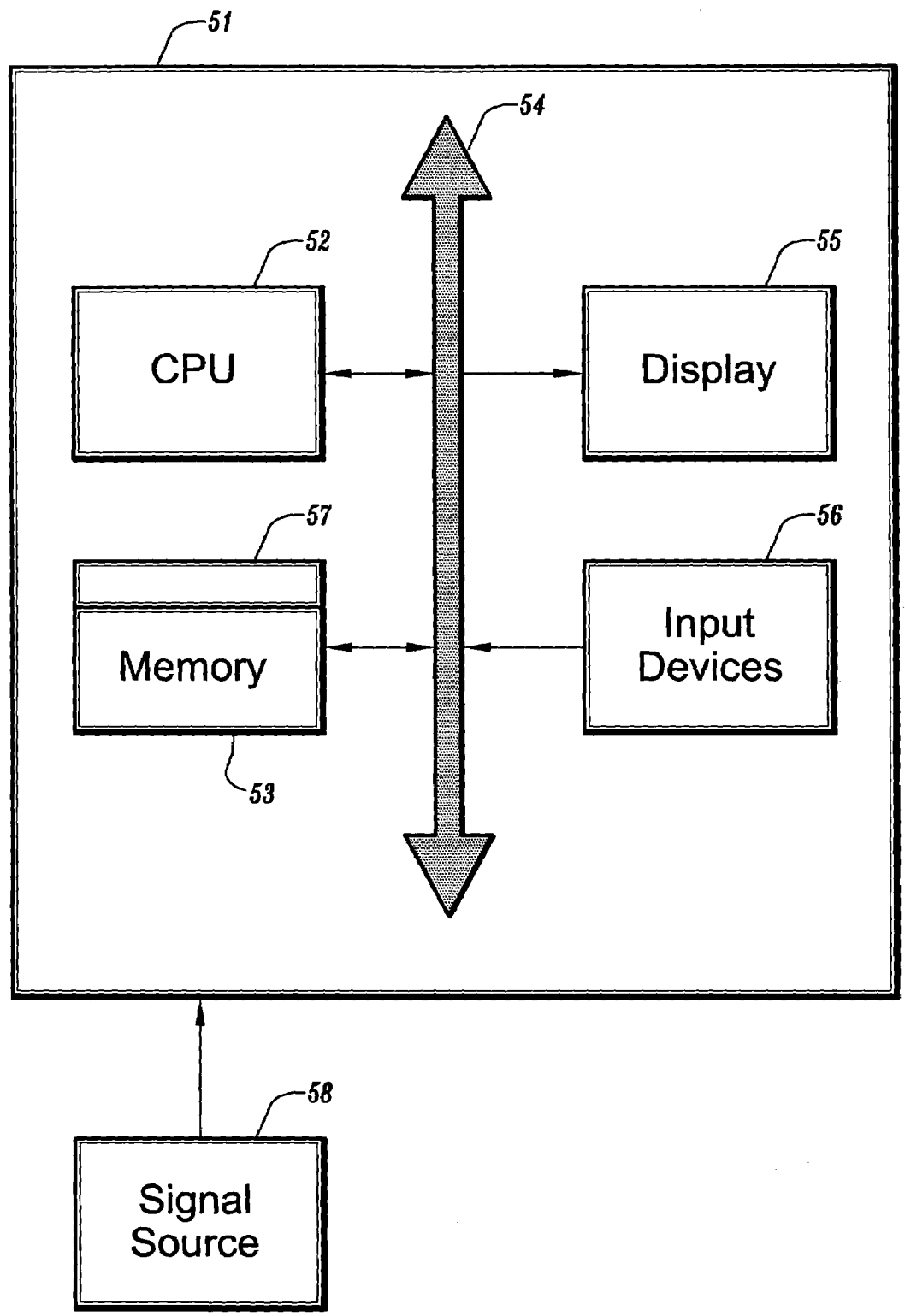
FIG. 5 depicts a flow chart of a toboggan cluster merger, according to an embodiment of the invention.

Referring now to FIG. 5, according to an embodiment of the present invention, a computer system 51 for implementing the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of identifying an object in a digital image, comprising the steps of:
    providing to a computer a digital image comprising a plurality of intensities corresponding to a domain of points in a N-dimensional space;
    providing to the computer a point in the image that is a concentration location;
    using the computer to initialize a cluster with said concentration location;
    using the computer to add the neighboring points of the concentration location to a list;
    using the computer to select a neighbor point with an extremal potential value from said list and removing said selected point from said list;
    using the computer to determine a slide direction of all neighbors of said selected point and identify those neighbors that slide to the selected point;
    using the computer to add those neighbor points not already in the list to the list;
    using the computer to add the selected point to the cluster; and
    repeating the steps of using the computer to select a neighbor point with an extremal potential value, determine a slide direction, add points to the list, and add the selected point to the cluster, until the list is empty.

2. The method of claim 1, further comprising using the computer to identify an object from said cluster.

3. The method of claim 1, further comprising using the computer to mark said concentration location with a label.

4. The method of claim 3, further comprising using the computer to mark the neighbors of said concentration location with said label.

5. The method of claim 4, further comprising using the computer to mark those neighbors that slide to the selected point and that are unmarked with the selected point's label.

6. The method of claim 1, further comprising using the computer to determine a toboggan potential for each neighbor of said concentration location.

7. The method of claim 6, wherein said toboggan potential is based on a distance map of each neighbor to a reference object.

* * * * *